US012211106B2

(12) United States Patent
Gupta et al.

(10) Patent No.: US 12,211,106 B2
(45) Date of Patent: Jan. 28, 2025

(54) METHOD TO DETERMINE THAT A CREDIT CARD NUMBER CHANGE HAS OCCURRED

(71) Applicant: Mastercard International Incorporated, Purchase, NY (US)

(72) Inventors: Smriti Gupta, New Delhi (IN); Gaurav Dhama, Gurgaon (IN); Hardik Wadhwa, Bangalore (IN); Puneet Vashisht, Gurgaon (IN); Yatin Katyal, Rohtak (IN); Ankur Saraswat, Gurgaon (IN); Aakash Deep Singh, Ladwa (IN)

(73) Assignee: Mastercard International Incorporated, Purchase, NY (US)

( * ) Notice: Subject to any disclaimer, the term of this patent is extended or adjusted under 35 U.S.C. 154(b) by 500 days.

(21) Appl. No.: 17/391,101

(22) Filed: Aug. 2, 2021

(65) Prior Publication Data

US 2023/0034850 A1 Feb. 2, 2023

(51) Int. Cl.
G06Q 40/12 (2023.01)
G06F 16/28 (2019.01)
G06N 3/045 (2023.01)

(52) U.S. Cl.
CPC ........... *G06Q 40/12* (2013.12); *G06F 16/285* (2019.01); *G06N 3/045* (2023.01)

(58) Field of Classification Search
CPC ....... G06Q 40/12; G06F 16/285; G06N 3/045
See application file for complete search history.

(56) References Cited

U.S. PATENT DOCUMENTS 7,006,993 B1 * 2/2006 Cheong .................. G06Q 20/28
705/40
2003/0225742 A1 * 12/2003 Tenner .................... G06F 16/25
(Continued)

FOREIGN PATENT DOCUMENTS

CN 107832338 A * 3/2018 ....... G06F 16/24522
WO WO-2020099550 A1 * 5/2020 ............. G06F 40/35

OTHER PUBLICATIONS

"PUF Constructions with Limited Information Leakage", Meng-Day Yu, Dissertation presented in partial fulfillment of the requirements for the degree of Doctor of Engineering Science, Ku Leuven Arenberg Doctoral School Faculty of Engineering Science, Jul. 2018. (Year: 2018).*

(Continued)

*Primary Examiner* — Pan G Choy
(74) *Attorney, Agent, or Firm* — Hovey Williams LLP

(57) ABSTRACT

A computing device for determining a new credit card number that is a continuation match with an old credit card number of a credit card account that has changed numbers comprises a processing element programmed to: receive transactional data for a plurality of credit card numbers, determine a plurality of old credit card numbers and a plurality of new credit card numbers, determine a plurality of clusters of new credit card numbers, convert the transactional data for each old credit card number and the associated cluster of new credit card numbers into snapshots with an image-like data format, train a modified siamese network with instances of snapshots of an old credit card number, a first new credit card number, and a second new credit card number, and use the modified siamese network to determine one new credit card number that is an upgrade of one old credit card number.

10 Claims, 9 Drawing Sheets

(56) References Cited

U.S. PATENT DOCUMENTS

| | | | |
|---|---|---|---|
| 2008/0016244 A1* | 1/2008 | Noonan | G06Q 10/10 709/246 |
| 2008/0270298 A1* | 10/2008 | McElroy | G06Q 40/02 705/39 |
| 2010/0030677 A1* | 2/2010 | Melik-Aslanian | G06Q 20/00 705/35 |
| 2016/0275463 A1* | 9/2016 | Bhatt | G06Q 20/102 |
| 2018/0129934 A1* | 5/2018 | Tao | G06N 3/084 |
| 2020/0118155 A1* | 4/2020 | Bloy | G06Q 10/02 |
| 2021/0232911 A1* | 7/2021 | Velagapudi | G06N 3/08 |

OTHER PUBLICATIONS

Mahajan et al., "Siamese neural networks for the classification of high-dimensional radiomic features", HHS Public Access, Author Manuscript, Proc SPIE Int. Soc. Opt. Eng. Feb. 2020; 11314. (Year: 2020).*

* cited by examiner

GENERIC IMAGE DATA FORMAT

| ROW NUMBER | COLUMN NUMBER | PIXEL NUMBER | RED SUBPIXEL VALUE | GREEN SUBPIXEL VALUE | BLUE SUBPIXEL VALUE |
|---|---|---|---|---|---|
| 1 | 1 | P1 | ### | ### | ### |
| 1 | 2 | P2 | ### | ### | ### |
| 1 | 3 | P3 | ### | ### | ### |
| 1 | 4 | P4 | ### | ### | ### |
| 1 | 5 | P5 | ### | ### | ### |
| 1 | 6 | P6 | ### | ### | ### |
| 2 | 1 | P7 | ### | ### | ### |
| 2 | 2 | P8 | ### | ### | ### |
| ⋮ | ⋮ | ⋮ | ⋮ | ⋮ | ⋮ |
| 8 | 5 | P47 | ### | ### | ### |
| 8 | 6 | P48 | ### | ### | ### |

*CREDIT CARD NUMBER*
*TRANSACTIONAL DATA SNAPSHOT*
*(ONE CARD NUMBER FOR ONE MONTH)*

| PW5,I1 | PW5,I2 | PW5,I3 | ••• | PW5,IX |
|---|---|---|---|---|
| PW4,I1 | PW4,I2 | PW4,I3 | ••• | PW4,IX |
| PW3,I1 | PW3,I2 | PW3,I3 | ••• | PW3,IX |
| PW2,I1 | PW2,I2 | PW2,I3 | ••• | PW2,IX |
| PW1,I1 | PW1,I2 | PW1,I3 | ••• | PW1,IX |

*CREDIT CARD NUMBER SNAPSHOT IMAGE-LIKE DATA FORMAT*

| PIXEL NUMBER | RED SUBPIXEL VALUE | GREEN SUBPIXEL VALUE | BLUE SUBPIXEL VALUE |
|---|---|---|---|
| PW1,I1 | MONEY SPENT WK1, IND1 | TRANS COUNT WK1, IND1 | MERCH COUNT WK1, IND1 |
| PW1,I2 | MONEY SPENT WK1, IND2 | TRANS COUNT WK1, IND2 | MERCH COUNT WK1, IND2 |
| PW1,I3 | MONEY SPENT WK1, IND3 | TRANS COUNT WK1, IND3 | MERCH COUNT WK1, IND3 |
| ⋮ | ⋮ | ⋮ | ⋮ |
| PW1,IX | MONEY SPENT WK1, INDX | TRANS COUNT WK1, INDX | MERCH COUNT WK1, INDX |
| PW2,I1 | MONEY SPENT WK2, IND1 | TRANS COUNT WK2, IND1 | MERCH COUNT WK2, IND1 |
| PW2,I2 | MONEY SPENT WK2, IND2 | TRANS COUNT WK2, IND2 | MERCH COUNT WK2, IND2 |
| ⋮ | ⋮ | ⋮ | ⋮ |
| PW5,I3 | MONEY SPENT WK5, IND3 | TRANS COUNT WK5, IND3 | MERCH COUNT WK5, IND3 |
| ⋮ | ⋮ | ⋮ | ⋮ |
| PW5,IX | MONEY SPENT WK5, INDX | TRANS COUNT WK5, INDX | MERCH COUNT WK5, INDX |

*Fig. 4*

METHOD TO DETERMINE THAT A CREDIT CARD NUMBER CHANGE HAS OCCURRED

FIELD OF THE INVENTION

Embodiments of the current invention relate to computing devices for determining that an old credit card number and a new credit card number belong to the same credit card account.

BACKGROUND

When a credit card expires, is lost or stolen, or switches to a different type or level of card, the credit card number changes, although the credit card account and account owner remain the same. In this situation, an issuer of the credit card, such as a bank or other financial institution, issues the new credit card number, but may not tell the credit card company that the credit card number has changed. Many credit card customers leave their credit card number with merchants, such as service providers or online vendors, who automatically bill the credit card on a periodic basis or at the time of a sale. Unfortunately, the credit card customers often forget to update the credit card number with the merchants when the number changes. In some cases, the issuer may provide automatic billing update (ABU) information, which links the old credit card number to the updated credit card number, to the merchant and the credit card company when the old credit card number is billed, thus allowing the transaction to be completed. However, in many cases, the issuer does not provide ABU information to the credit card company. Due to customer privacy concerns, the credit card company cannot simply look at the account holder's information in order to link a new credit card number to the old credit card number. As a result, it is difficult to match two credit card numbers to the same credit card account, especially given that the credit may have an extremely large amount of card numbers to track.

SUMMARY OF THE INVENTION

Embodiments of the current invention address one or more of the above-mentioned problems and provide a distinct advance in the art of matching a new credit card number to an old credit card for a credit card whose number has changed, for example, as a result of the credit card expiring, being lost or stolen, or switching to a different type or level of card. Specifically, embodiments of the present invention may provide a computing device that utilizes advances in machine learning to match an old credit card number and a new credit card number to the same credit card account based on transactional history and, preferably, without the need to access the account holder's personal information.

The computing device broadly comprises a processing element in electronic communication with a memory element and programmed or configured to: receive transactional data for a plurality of credit card numbers for a plurality of credit card customers; determine a plurality of old credit card numbers and a plurality of new credit card numbers so that one of the new credit card numbers can be matched with a corresponding one of the old credit card numbers; determine a first plurality of clusters of new credit card numbers including one cluster of new credit card numbers associated with each old credit card number; convert the transactional data for each old credit card number and the cluster of new credit card numbers associated with each old credit card number into a plurality of snapshots with an image-like data format; train a modified siamese network with a plurality of instances of snapshots associated with a combination of an old credit card number, a new credit card number that is an upgrade of the old credit card number, and a new credit card number that is not an upgrade of the old credit card number; and use the modified siamese network to determine one new credit card number that is an upgrade continuation match of one old credit card number for each old credit card number.

Another embodiment of the current invention provides a computing device for determining a new credit card number that is a continuation match with an old credit card number of a credit card account that has changed numbers. The computing device broadly comprises a processing element in electronic communication with a memory element and programmed or configured to: receive transactional data for a plurality of credit card numbers for a plurality of credit card customers; determine a plurality of old credit card numbers and a plurality of new credit card numbers so that one of the new credit card numbers can be matched with a corresponding one of the old credit card numbers; determine a first plurality of clusters of new credit card numbers including one cluster of new credit card numbers associated with each old credit card number; serialize the transactional data for each old credit card number and each cluster of new credit card numbers that is associated with the old credit card numbers; embed the serialized transactional data in a plurality of input vectors for each old credit card number; input the input vectors for each old credit card number into a transformer encoder to generate a plurality of output vectors; input the output vectors into a transformer decoder to generate predicted transactional activity for each old credit card number; compare the predicted transactional activity for one old credit card number with actual transactional activity for each new credit card number in the cluster associated with the old credit card number; and determine a new credit card number that is the continuation of the old credit card number according to a difference between the predicted transactional activity of the old credit card number and the actual transactional activity of the new credit card numbers in the associated cluster for the old credit card number.

Yet another embodiment of the current invention provides a computing device for determining a new credit card number that is a continuation match with an old credit card number of a credit card account that has changed numbers. The computing device broadly comprises a processing element in electronic communication with a memory element and programmed or configured to: receive transactional data for a plurality of credit card numbers for a plurality of credit card customers; determine a plurality of old credit card numbers and a plurality of new credit card numbers so that one of the new credit card numbers can be matched with a corresponding one of the old credit card numbers; determine a first group of old credit card numbers that have likely been upgraded and a second group of old credit card numbers that have likely not been upgraded; determine a plurality of clusters of new credit card numbers with one cluster of new credit card numbers associated with each old credit card number in the first group and one cluster of new credit card numbers associated with each old credit card number in the second group; convert the transactional data for each old credit card number in the first group and the cluster of new credit card numbers associated with each old credit card number into a plurality of snapshots with an image-like data format; train a modified siamese network with a plurality of instances of snapshots associated with a combination of an old credit card number not in the first group or the second group, a new credit card number that is an upgrade of the old credit card number, and a new credit card number that is not an upgrade of the old credit card number; use the modified siamese network to determine one new credit card number that is an upgrade continuation match of one old credit card number for each old credit card number in the first group; serialize the transactional data for each old credit card number in the second group of old credit card numbers and each cluster of new credit card numbers that is associated with the old credit card numbers; embed the serialized transactional data in a plurality of input vectors for each old credit card number in the second group; input the input vectors for each old credit card number into a transformer encoder to generate a plurality of output vectors; input the output vectors into a transformer decoder to generate predicted transactional activity for each old credit card number; compare the predicted transactional activity for one old credit card number with actual transactional activity for each new credit card number in the cluster associated with the old credit card number; and determine a new credit card number that is the continuation of the old credit card number according to a difference between the predicted transactional activity of the old credit card number and the actual transactional activity of the new credit card numbers in the associated cluster for each old credit card number in the second group.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 4 is a depiction of a credit card number transactional data snapshot and a data format table for the snapshot;

Figure 8:
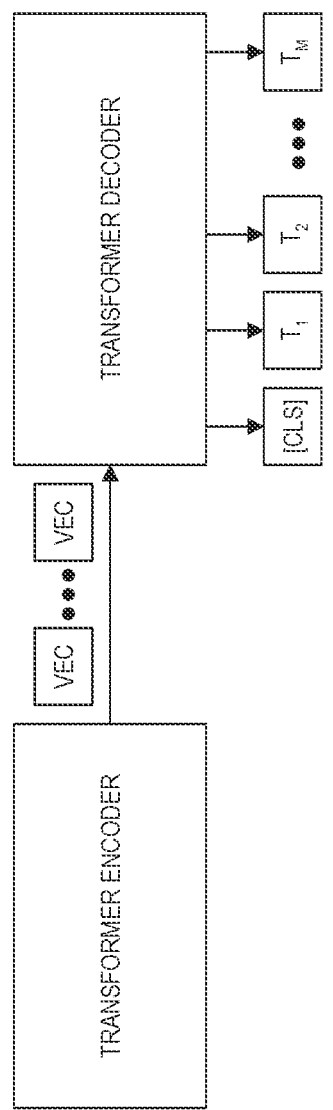
Figure 9A:
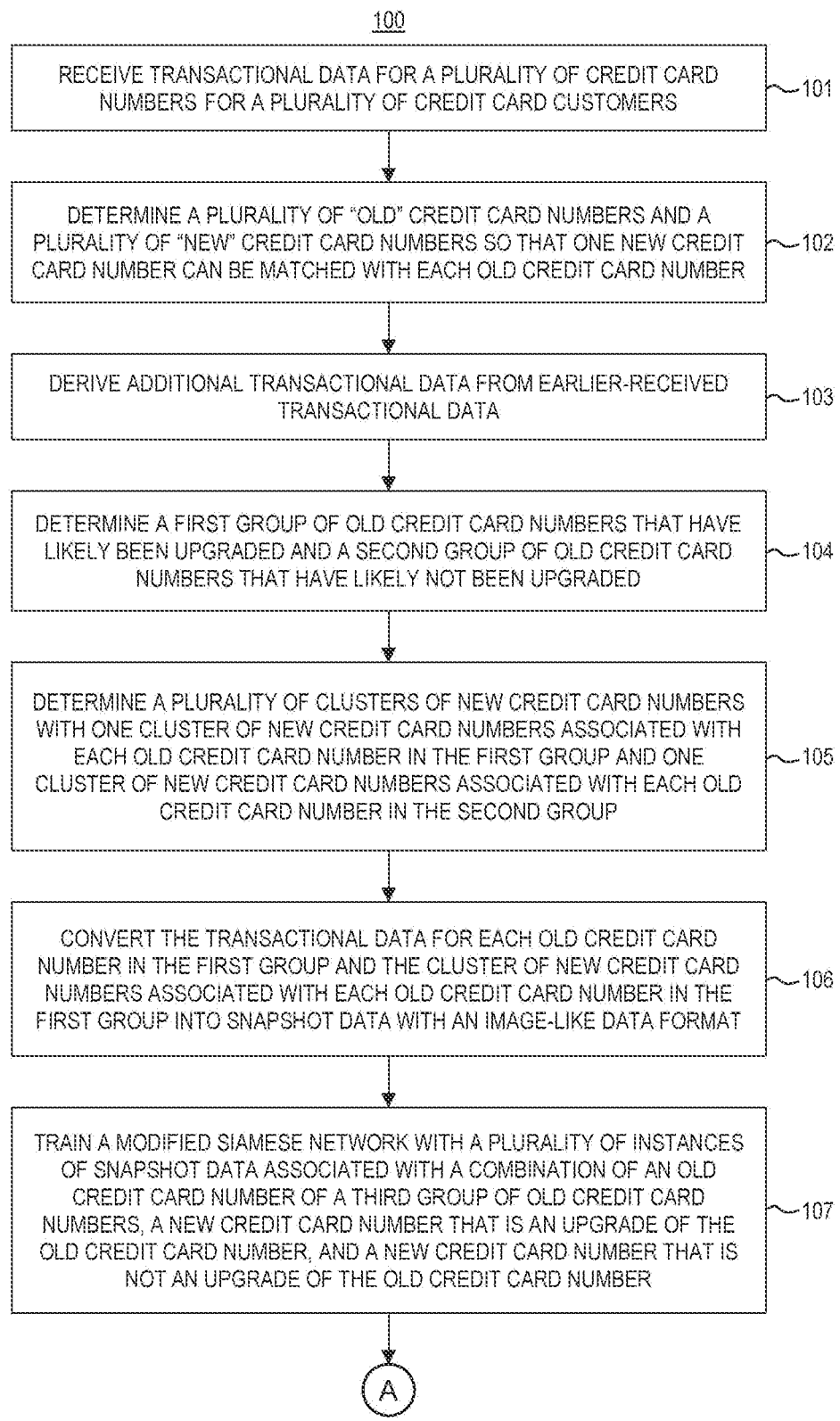
Figure 9B:
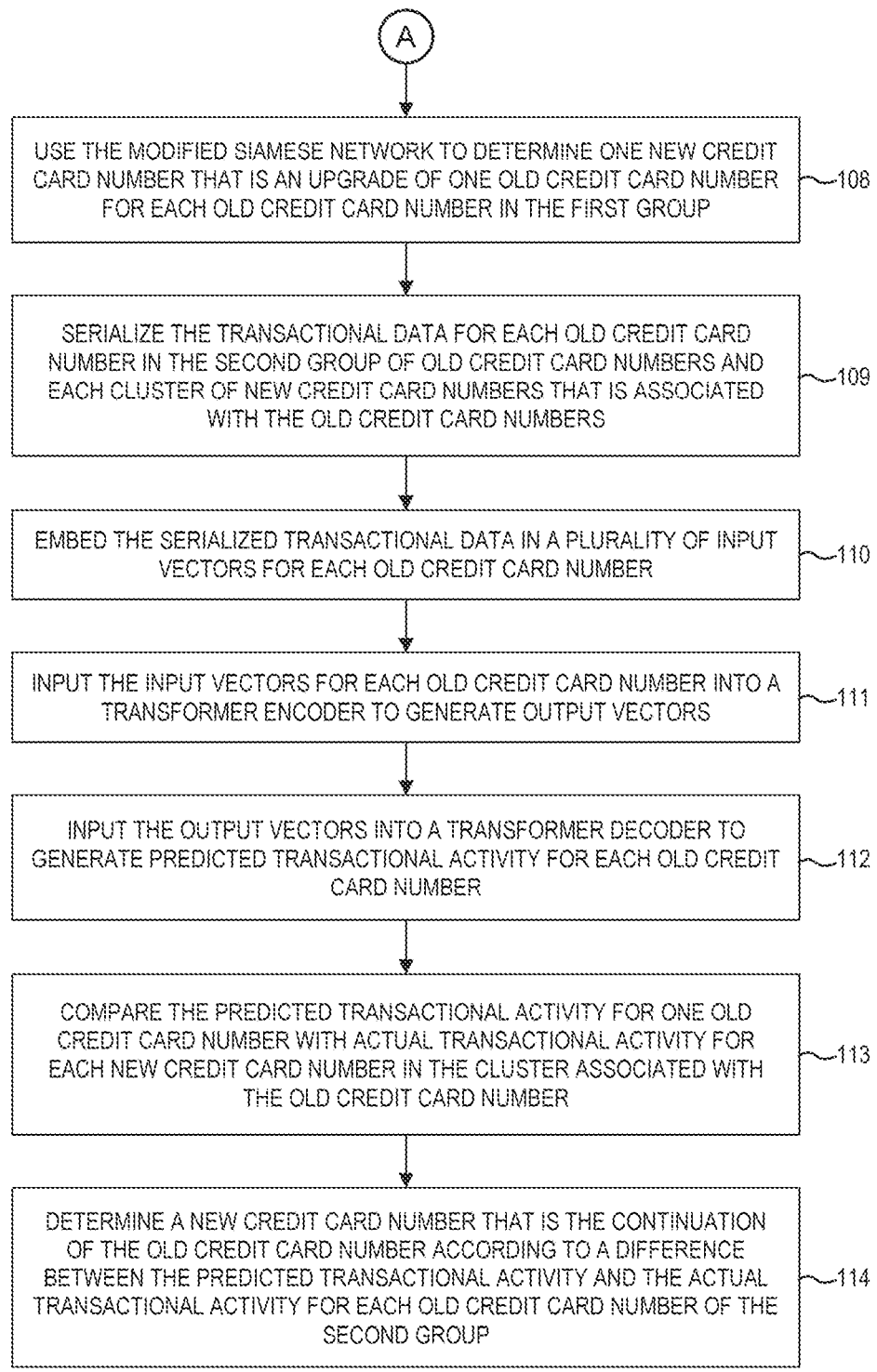

FIG. 8 is a schematic block diagram of the transformer encoder outputting a plurality of output vectors that are received by a transformer decoder; and FIGS. 9A and 9B depict a listing of at least a portion of the steps of a method for determining a new credit card number that is a continuation match with an old credit card number of a credit card that has changed numbers according to various embodiments of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Figure 1:
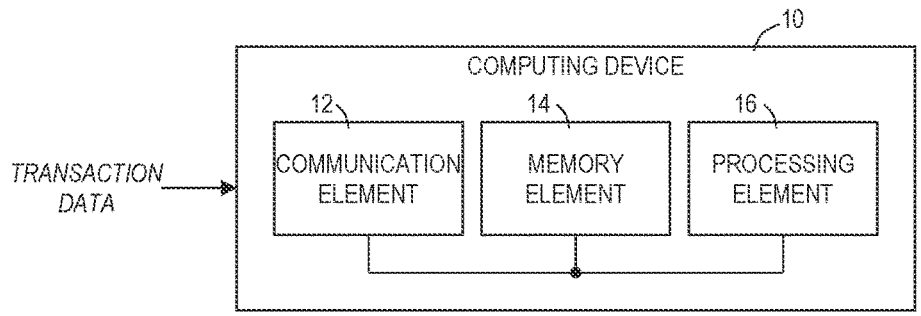
FIG. 1 is a schematic block diagram of a computing device, constructed in accordance with various embodiments of the invention, for determining a new credit card number that is a continuation match with an old credit card number of a credit card that has changed numbers.

Referring to FIG. 1, a computing device 10, constructed in accordance with various embodiments of the current invention, is shown for determining a new credit card number that is a continuation match with an old credit card number of a credit card that has changed numbers. The new credit card number may have been issued because the old credit card was upgraded, was lost or stolen, or the old credit card number expired. The computing device 10 may be embodied by one or more computer servers, workstation computers, desktop computers, laptop computers, or the like, or combinations thereof. The computing device 10 broadly comprises a communication element 12, a memory element 14, and a processing element 16.

The communication element 12 generally allows the computing device 10 to communicate with other computing devices, external systems, networks, and the like. The communication element 12 may include signal and/or data transmitting and receiving circuits, such as antennas, amplifiers, filters, mixers, oscillators, digital signal processors (DSPs), and the like. The communication element 12 may establish communication wirelessly by utilizing radio frequency (RF) signals and/or data that comply with communication standards such as cellular 2G, 3G, 4G, Voice over Internet Protocol (VoIP), LTE, Voice over LTE (VoLTE), or 5G, Institute of Electrical and Electronics Engineers (IEEE) 802.11 standard such as WiFi, IEEE 802.16 standard such as WiMAX, Bluetooth™, or combinations thereof. In addition, the communication element 12 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 12 may establish communication through connectors or couplers that receive metal conductor wires or cables which are compatible with networking technologies such as ethernet. In certain embodiments, the communication element 12 may also couple with optical fiber cables. The communication element 12 may be in electronic communication with the memory element 14 and the processing element 16.

The memory element 14 may be embodied by devices or components that store data in general, and digital or binary data in particular, and may include exemplary electronic hardware data storage devices or components such as readonly memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, solid state memory, or the like, or combinations thereof. In some embodiments, the memory element 14 may be embedded in, or packaged in the same package as, the processing element 16. The memory element 14 may include, or may constitute, a non-transitory "computer-readable medium". The memory element 14 may store the instructions, code, code statements, code segments, software, firmware, programs, applications, apps, services, daemons, or the like that are executed by the processing element 16. The memory element 14 may also store data that is received by the processing element 16 or the device in which the processing element 16 is implemented. The processing element 16 may further store data or intermediate results generated during processing, calculations, and/or computations as well as data or final results after processing, calculations, and/or computations. In addition, the memory element 14 may store settings, data, documents, sound files, photographs, movies, images, databases, and the like.

The processing element 16 may comprise one or more processors. The processing element 16 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 16 may generally execute, process, or run instructions, code, code segments, code statements, software, firmware, programs, applications, apps, processes, services, daemons, or the like. The processing element 16 may also include hardware components such as registers, finite-state machines, sequential and combinational logic, configurable logic blocks, and other electronic circuits that can perform the functions necessary for the operation of the current invention. In certain embodiments, the processing element 16 may include multiple computational components and functional blocks that are packaged separately but function as a single unit. In some embodiments, the processing element 16 may further include multiprocessor architectures, parallel processor architectures, processor clusters, and the like, which provide high performance computing. The processing element 16 may be in electronic communication with the other electronic components through serial or parallel links that include universal busses, address busses, data busses, control lines, and the like.

The processing element 16 may be operable, configured, or programmed to perform the following functions by utilizing hardware, software, firmware, or combinations thereof. The processing element 16 receives, through the communication element 12, data regarding credit card transactions for a plurality of transactions for a plurality of credit card customers. The data may include a transaction timestamp (such as a date and time of day), a geolocation (such as an address) where the transaction occurred, an amount of money spent, or a value of the transaction, a name of the merchant billing the transaction, a merchant category code, a code as to whether the credit card was present or not for the transaction, an issuer of the credit card, a type or level of credit card (such as standard, travel miles, silver, gold, platinum, etc.), and so forth. The data includes transactions from credit cards that have different credit card numbers but are known to be connected to the same account and/or account owner (through automatic billing update (ABU) information) as well as credit cards with different credit card numbers for which it is not known whether any two credit cards are connected to the same account.

The processing element 16 determines "old" credit card numbers and "new" credit card numbers from the transaction data. Old credit card numbers may correspond to a plurality of transactions that occurred before a given first date (wherein the first date may be different for each credit card number), but where the transactions stopped after the first date because the credit card associated with the old credit card number was, for example, lost or stolen, expired, or upgraded. New credit card numbers may correspond to a plurality of transactions that occurred after a given second date (wherein the second date may be different for each credit card number), since it is likely the new credit card number issued around the time of the second date.

The processing element 16 derives some additional data from the received data. For example, the processing element 16 may derive an industry in which the transaction occurred from the name of the merchant and/or the merchant category code. The processing element 16 may derive a week number from the timestamp data representing a week of a month in which the transaction occurred. The week number may have a value from 1 to 5, wherein if the date of the transaction occurred on any of days 1-7, then the week number is 1; if the date of the transaction occurred on any of days 8-14, then the week number is 2; and so forth. The processing element 16 may assign a week number to each transaction based on the timestamp of when the transaction occurred. The processing element 16 may derive transaction counts as a total number of transactions that occurred for a given parameter, such as card number, industry, etc., for a given time period. The processing element 16 may derive merchant counts as a total number of merchants for a given industry, a given time period, or the like. The processing element 16 may derive a total amount of money billed to each industry.

Figure 2:
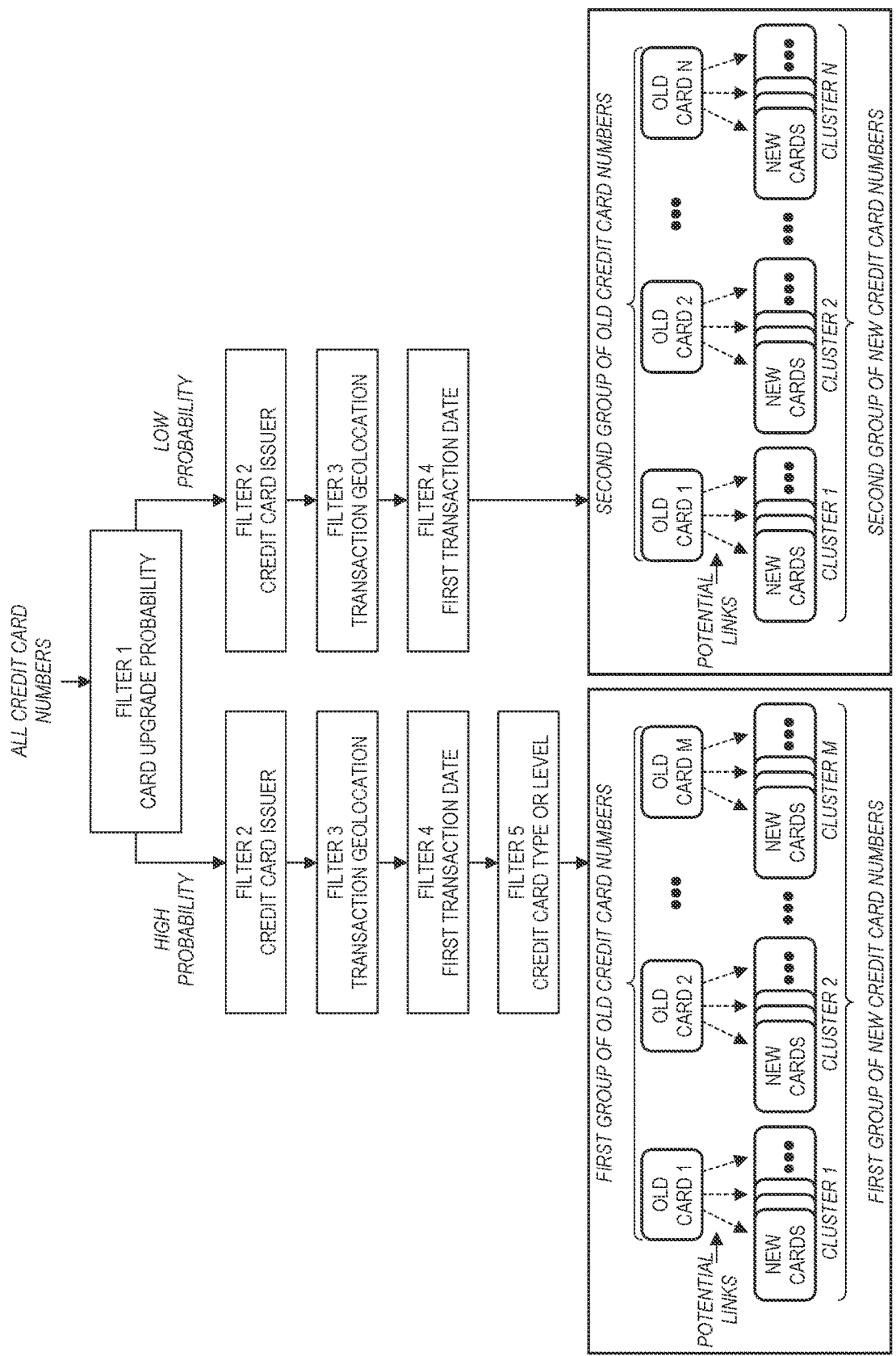
FIG. 2 is a flow diagram depicting a filtration process for a plurality of credit card numbers.

One of the goals of embodiments of the invention is to link or match one new credit card number with one old credit card number for the same credit card account, wherein the new credit card number is a continuation of the account of the old credit card number. Thus, for each old credit card number, the potential new credit card number which is the continuation of the old credit card number may be selected from all of the new credit card numbers. There may be tens or hundreds of thousands of old credit card numbers and new credit card numbers. In order to reduce the amount of data to process, the processing element 16 applies a plurality of filters to the data, as shown in FIG. 2. A first filter filters out old credit card numbers, while subsequent filters reduce the number of new credit card numbers that could be considered continuations for each old credit card number. The filters after the first filter may be applied in any order.

The processing element 16 applies the first filter based on a probability that an old credit card number has stopped transacting as a result of the credit card being upgraded to a card with enhanced benefits. Typically, credit card upgrade offers are made to customers based on their spending patterns or habits. Given the ABU information, the processing element 16 has a record of a plurality of old credit card numbers that are known to have changed to new credit card numbers as the result of a card upgrade. Therefore, the processing element 16 has a transaction history, and thus, spending patterns, of each of the old credit card numbers and can develop models that are indicative of credit card numbers that have stopped transacting because they have been upgraded, as opposed to other reasons for no longer transacting. The models may be based on spending patterns and other data. For each old credit card number, the processing element 16 computes a probability of whether the credit card associated with it has been upgraded. For each old credit card number with a probability greater than or equal to an upgrade threshold, the processing element 16 labels that credit card number as high probability and applies subsequent filters to it. For each old credit card number with a probability less than the upgrade threshold, the processing element 16 labels that credit card number as low probability and applies some of the same filters to it.

One further reason for separating the old credit card numbers into a first group that is likely to have been upgraded and a second group that is not likely to have been upgraded is that spending habits may change with a credit card that has been upgraded. On the other hand, spending habits are likely to remain the same with a credit card whose number changes due to expiration of the old card number or the old card being lost or stolen, although there may be a short disruption in transactions if the card is lost or stolen. Given the differences in spending habits between the two groups, a different matching process is applied to each group, as discussed in more detail below.

Following the high probability path shown in FIG. 2, the processing element 16 applies a second filter based on the issuer of the credit card. For each old credit card number, the processing element 16 eliminates all of the new credit card numbers that have a different issuer from the old credit card number.

The processing element 16 applies a third filter based on a geolocation of the transactions of the new credit card numbers compared with the old credit card numbers. For example, for each old credit card number, the processing element 16 compares the geolocations of a portion of the transactions with the geolocations of a portion of the transactions of each of the new credit card numbers. If the geolocations of the transactions for a new credit card number are greater than a threshold distance from the geolocations of the transactions of the old credit card number, then the processing element 16 eliminates the new credit card number as being an upgrade continuation for the old credit card number.

The processing element 16 applies a fourth filter based on a time period during which a first transaction of a new credit card number occurs. Typically, when a credit card changes from an old number to a new number, the new credit card number is used for a first time within a threshold time period, or window, such as three months, after the old credit card number stops transacting, and, in some embodiments, not before the old credit card number stops transacting. Thus, for each old credit card number, the processing element 16 compares a date of the first transaction of the new credit card numbers with a date of the last transaction of the old credit card number. The processing element 16 eliminates the new credit card number as being a continuation for the old credit card number if the date of the first transaction of the new credit card number occurs outside of a threshold time period (approximately three months) of the date of the last transaction of the old credit card number.

The processing element 16 applies a fifth filter based on a type or level of credit card. For example, for each old credit card number, the processing element 16 compares the type or level of the credit card, such as silver, gold, platinum, world, world elite, etc., with the type or level of the new credit card numbers. The processing element 16 eliminates the new credit card number as being an upgrade continuation match for the old credit card number if the type or level of the new credit card number is a downgrade, such as going from world elite to world, from the old credit card number.

As shown at the bottom of FIG. 2, after the filters have been applied to all of the old credit card numbers likely to have upgraded, a first group of old credit card numbers and a first group of new credit card numbers are created. For each old credit card number, "Old Card #" in FIG. 2 wherein the number # ranges from 1 to M, there is an associated cluster, "Cluster #" in FIG. 2 wherein the number # ranges from 1 to M, of new credit card numbers, "New Cards" in FIG. 2, which are potential links as the upgrade of the old credit card number. It is possible that each cluster of new credit card numbers has a plurality of credit card numbers that are the same as in one or more of the other clusters. The processing element 16 applies a first matching process, discussed below, that tries to match one new credit card number with each old credit card number as the upgrade continuation match of the old credit card number.

Following the low probability path shown in FIG. 2, the processing element 16 applies filters 2, 3, and 4 to the old credit card numbers that have likely not upgraded. The processing element 16 may not apply filter 5 because it is unlikely that the type or level of credit card would change if the old number expires or the credit card is lost or stolen. The processing element 16 may apply the filters to each group of credit card numbers (high upgrade probability and low upgrade probability) at roughly the same time or may apply the filters to one group before applying the filters to the other group. After the filters have been applied to all of the old credit card numbers not likely to have been upgraded, a second group of old credit card numbers and a second group of new credit card numbers are created. For each old credit card number, "Old Card #" in FIG. 2 wherein the number # ranges from 1 to N, there is an associated cluster, "Cluster #" in FIG. 2 wherein the number # ranges from 1 to N, of new credit card numbers, "New Cards #" in FIG. 2, which are potential links or continuation matches of the old credit card number. It is possible that each cluster of new credit card numbers has a plurality of credit card numbers that are the same as in one or more of the other clusters. The processing element 16 applies a second matching process, discussed below, that tries to match one new credit card number with each old credit card number as the continuation match of the old credit card number.

Before applying the first matching process to the first group of old credit card numbers, the processing element 16 segments the transactional data associated with the first group of old credit card numbers and the first group of new credit card numbers by creating a plurality of snapshots of transactional data with each snapshot including the received data and derived data in an image-like data format. Generally, an image is formed by a plurality of picture elements ("pixels") arranged in a two-dimensional grid. The data representing an image includes a color or intensity value for each pixel present in the image, wherein the image includes a first number of pixels in the X dimension (Px) and a second number of pixels in the Y dimension (Py) such that a total number of pixels (Pxy) is first number multiplied by second number (Px×Py). In other words, there may be Py rows of pixels and Px columns of pixels. In addition, each pixel includes a red subpixel, a green subpixel, and a blue subpixel (RGB), wherein each subpixel has a value as well. Thus, the image-like data format may include three values for each pixel in a first row of pixels, three values for each pixel in a second row of pixels, and so forth through the last row of pixels.

Figure 3:
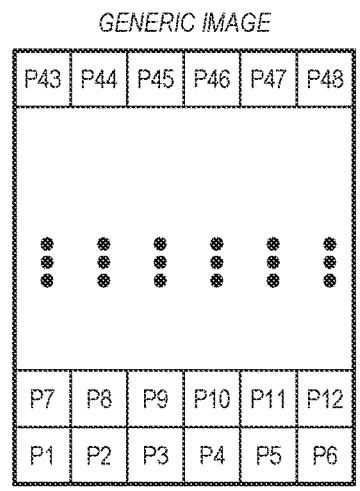
FIG. 3 is a depiction of a generic image and a data format table for the generic image.

An exemplary generic image is shown in FIG. 3 and, in this example, includes 6 pixels by 8 pixels for a total of 48 pixels. FIG. 3 also includes an example of a generic image data format shown in a tabular format with numeric values for red subpixels, green subpixels, and blue subpixels, along with a plurality of labels and values for row numbers, column numbers, and pixel numbers. An image data file may actually only include the values for the subpixels in a sequential listing along with metadata about the file—although this file description typically only applies to uncompressed and/or unencoded image data file formats. Compressed and/or encoded image data files may have a different format.

To form one snapshot of transaction data in the image-like data format, the processing element 16 gathers all of the transaction data for one credit card number. An example of the transaction data for one credit card number in snapshot form is shown in FIG. 4, wherein the snapshot includes a plurality of pixels. The pixels have a naming format of "PW #,I #", wherein "P" refers to each pixel, "W #" refers to a week number, and "I #" refers to a number, or code, of an industry—all as described in more detail below.

Each row of pixels includes received and/or derived data regarding transactions that occurred within the same week, that is, transactions having the same week number, "W #" in FIG. 4. For example, the first row of pixels includes transactional data that has a week number equal to 1. The second row of pixels includes transactional data that has a week number equal to 2—and so forth through row number 5 with week number 5.

Each column of pixels includes received and/or derived data regarding transactions that occurred in a particular industry or has a particular merchant category code, "I #" in FIG. 4. For example, a first column of pixels may include transactional data that occurred in a medical industry, such as a doctor's office. A second column of pixels may include transactional data that occurred in the medical industry, such as a hospital. A third second column of pixels may include transactional data that occurred in the airline industry. A fourth second column of pixels may include transactional data that occurred in the hotel industry. There may be "X" (dozens or hundreds) columns of pixels, each relating to transactions occurring in a specific industry and/or merchant category code.

Also shown in FIG. 4 is a table illustrating the data format of a snapshot including a format for each subpixel of each pixel. Each individual pixel includes red, green, and blue subpixel values. The subpixel values may include received and/or derived data regarding various transactional metrics. For example, the red subpixel value may include a total amount of money spent for the particular week number (row number) and the particular industry (column number). The green subpixel value may include a transaction count or total number of transactions for the particular week number (row number) and the particular industry (column number). The blue subpixel value may include a merchant count or total number of merchants involved in transactions for the particular week number (row number) and the particular industry (column number). All of the subpixel values are related to the same credit card number for each snapshot of data. The subpixel values may include received and/or derived data regarding other transactional metrics and still be within the scope of the current invention.

Each snapshot includes a listing of numbers which are the values for each subpixel of each pixel for one card number for one month's worth of transactions. The numbers may be listed in the sequence shown in the table of FIG. 4 or in another sequence. The snapshot may also include metadata and/or separators between the numbers.

The processing element 16 forms the snapshots, each snapshot including the data as discussed above for one credit card number for one month. If the transactional data does not include data for some of the pixel categories, such as a particular industry for a particular week, the processing element 16 may fill those values with zeros.

Before applying the first matching process, the processing element 16 also trains a modified Siamese network using snapshot data from at least two months for a plurality of credit card numbers. The Siamese network includes at least two neural networks of the same architecture, each neural network including the same weights. Each neural network may include one or more artificial neural networks that each have an input layer of neurons, a hidden layer of neurons, and an output layer of neurons. Each neuron may execute a mathematical function involving a weight (W) and an input (x), wherein the weight and the input may vary for each neuron and the mathematical function is often multiplication of the weight and the input. An exemplary neural network includes a convolutional neural network (CNN) coupled with a long short term memory (LSTM) network, wherein the output of one network provides the input to the other network. Generally, each neural network receives a first data set, such as a snapshot, as an input and outputs a second data set, typically smaller in size or number than the first data set, which includes only the fundamental features, or the essence, of the first data set.

Figure 5:
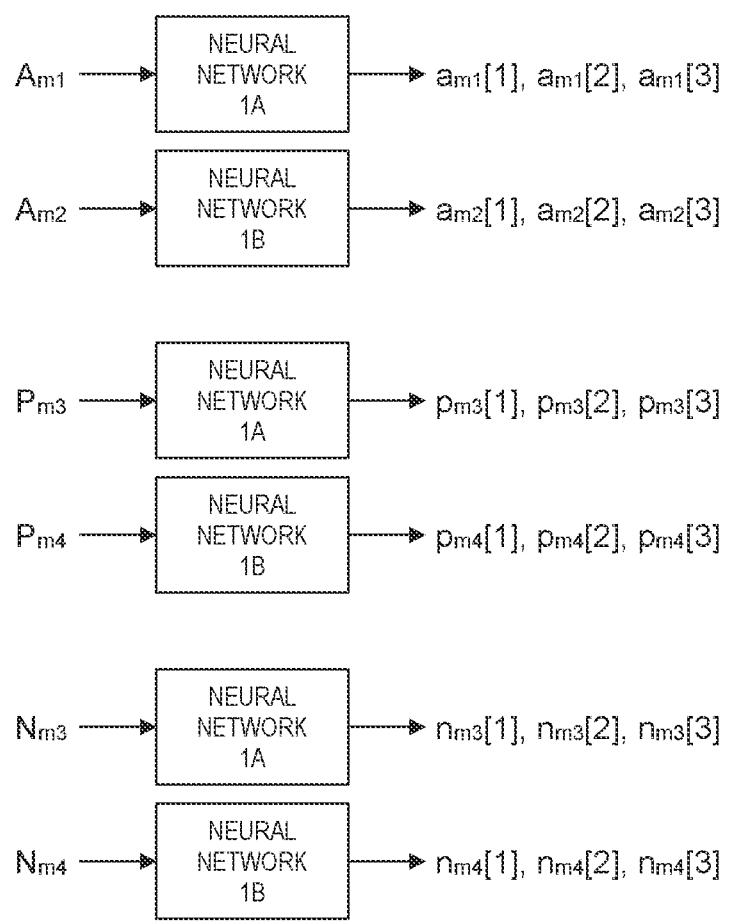
FIG. 5 is a schematic block diagram of a plurality of modified Siamese networks receiving training data.

The processing element 16 trains the modified Siamese network to be able to identify new credit card numbers that are continuations of old credit card numbers for which the credit card was upgraded. Referring to FIG. 5, the processing element 16 trains the modified Siamese network in part using the snapshot data from an old credit card number (A) which is known to have been upgraded (from the ABU information). The snapshot data includes a first month (m1) and a second month (m2), wherein the first month and the second month may be consecutive or there may be an interval between the first month and the second month. Thus, Am1 is a first snapshot from the first month and Am2 is a second snapshot from the second month. The modified Siamese network receives the snapshots Am1 and Am2 as inputs and outputs three components (a[1], a[2], a[3]) for each month, wherein one or more of the components may include delta information.

The processing element 16 also trains the modified Siamese network in part using the snapshot data from a new credit card number (P) known to be the upgrade continuation match of the old credit card number A from the ABU information. That is, the new credit card number P and the old credit card number A are known to be from the same credit card account. The snapshot data includes a third month (m3) and a fourth month (m4), wherein the third month and the fourth month may be consecutive or there may be an interval between the third month and the fourth month. Pm3 is a third snapshot from the third month and Pm4 is a fourth snapshot from the fourth month. In some embodiments, the interval between the first month and the second month is the same as the interval between the third month and fourth month. The modified Siamese network receives the snapshots Pm3 and Pm4 as inputs and outputs three components (p[1], p[2], p[3]) for each month.

The processing element 16 further trains the modified Siamese network in part using the snapshot data from a new credit card number (N) during the third month m3 and the fourth month m4, with Nm3 being a fifth snapshot and Nm4 being a sixth snapshot. The new credit card number N is known, perhaps through ABU information, to be unrelated to, and not associated with the same credit card account as, the old credit card number A. The modified Siamese network receives the snapshots Nm3 and Nm4 as inputs and outputs three components (n[1], n[2], n[3]) for each month.

The processing element 16 may input the snapshots Am1, Am2, Pm3, Pm4, Nm3, Nm4 into the modified Siamese network simultaneously utilizing multiple instances of the modified Siamese network or serially, in any order, utilizing a single instance of the modified Siamese network. In order to further train the modified Siamese network, the processing element 16 minimizes a modified loss function and back propagates updates to the weights of the neurons of the modified Siamese network. An exemplary modified loss function is shown below:

$$\max((a_{m1}[1]-p_{m3}[1])^2+(a_{m2}[1]-p_{m4}[1])^2+\{(a_{m2}[3]-a_{m1}[2])-(p_{m4}[3]-p_{m3}[2])\}^2-(a_{m1}[1]-n_{m3}[1])^2+(a_{m2}[1]-n_{m4}[1])^2+\{(a_{m2}[3]-a_{m1}[2])-(n_{m4}[3]-n_{m3}[2])\}^2+\text{Margin},0)$$

The processing element 16 may apply techniques such as gradient descent to back propagate updates to the weights. Furthermore, the processing element 16 may train the modified Siamese network with multiple combinations of an old credit card number, a known continuation new credit card number, and a known unrelated new credit card number. The training may continue until the changes to the weights are small.

Figure 6:
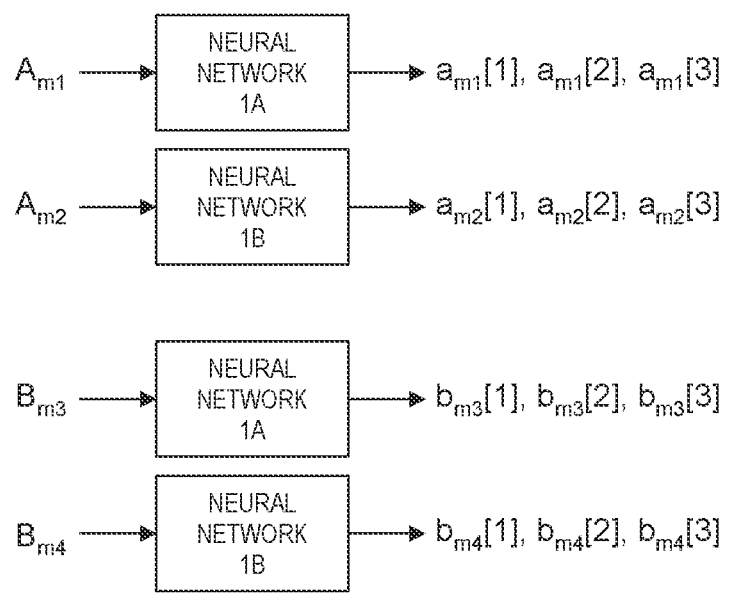
FIG. 6 is a schematic block diagram of modified Siamese networks receiving regular data.

Once the modified Siamese network is properly trained, the processing element 16 utilizes the modified Siamese network in a first matching process to determine the new credit card number that is an upgrade continuation match for each of the old credit card numbers. Referring to FIG. 6, the processing element 16 inputs a first snapshot from a first month (Am1) for an old credit card number and a second snapshot from a second month (Am2) for the old credit card number into the modified Siamese network. The processing element 16 starts with old credit card number 1, as shown in FIG. 4, in an attempt to match old credit card number 1 with one of the new credit card numbers from the first cluster of new credit card numbers. The modified Siamese network outputs three components (am1[1], am1[2], am1[3]) for the first snapshot and three components (am2[1], am2[2], am2[3]) for the second snapshot.

The processing element 16 inputs a third snapshot from a third month (Bm3) for a new credit card number and a fourth snapshot from a fourth month (Bm4) for the new credit card number into the modified Siamese network, wherein the new credit card number may be the first credit card number from the first cluster of new credit card numbers. The modified Siamese network outputs three components (bm3[1], bm3[2], bm3[3]) for the third snapshot and three components (bm4[1], bm4[2], bm4[3]) for the fourth snapshot. The processing element 16 calculates a cost function to determine the difference between the data for the old credit card number and the data for the new credit card number. An exemplary cost function is shown below:

$$(a_{m1}[1]-[1]-b_{m3}[1])^2+(a_{m2}[1]-b_{m4}[1])^2+\{(a_{m2}[3]-a_{m1}[2])-(b_{m4}[3]-b_{m3}[2])\}^2$$

The processing element 16 inputs the appropriate snapshots and calculates the cost function for the old credit card number and each of the new credit card numbers from the first cluster of new credit card numbers in turn. The combination of the old credit card number and the new credit card number with the lowest value cost function indicates that the new credit card number is likely the upgrade continuation match of the old credit card number and the two numbers are associated with the same credit card account.

The processing element 16 repeats the above process of inputting two snapshots for one of the old credit card numbers and two snapshots for each of the new credit card numbers of subsequent clusters of credit card numbers into the modified Siamese network, calculating the cost function for each combination of old credit card number and new credit card number, and determining the combination with the lowest cost. The process repeats until an upgrade continuation match of one new credit card number has been determined for each of the old credit card numbers.

The processing element 16 applies a second matching process to the second group of old credit card numbers that were determined to not likely have upgraded and that have been filtered so that each old credit card number has a cluster of new credit card numbers that are potential continuations (links) of the old credit card number. The second matching process includes the following steps according to embodiments of the present invention.

The processing element 16 serializes or sequences the transactional data for each old credit card number in the second group of old credit card numbers and each new credit card number in the second group of new credit card numbers. The processing element 16 sorts and/or arranges the data associated with each transaction, such as time of day of transaction, transaction money amount, geolocation of the transaction, industry of transaction, merchant or merchant code involved, and the like, for each credit card number chronologically, or in the order in which they occurred. For example, the processing element 16 may generate the daily transaction information, i.e., all of the information associated with the transactions that occurred during one day, in sequential order for each month for a period of several months up to a year or more. One reason to sort the transaction data into the daily transactions that occur within a month is that often recurring, or periodic, payments occur once a month. For example, many services, such as phone service, cable TV, audio or video streaming services, and the like, bill their customers and automatically collect payment once a month. Furthermore, those types of payments are typically made on the same date each month. Thus, patterns based on the same payment being made on the same date each month may be recognized.

Figure 7:
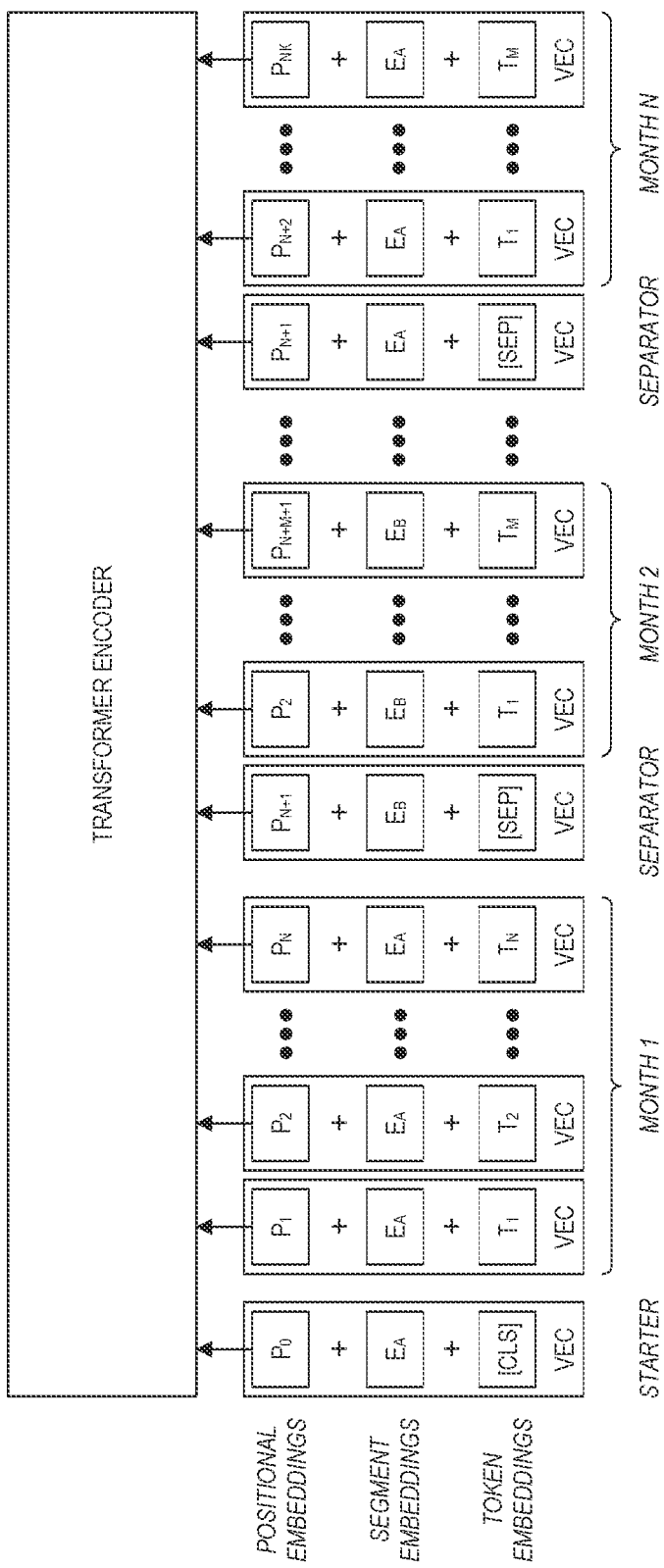
FIG. 7 is a schematic block diagram of a transformer encoder receiving regular a plurality of transactional data vectors.

Once the transactional data is serialized, the processing element 16 embeds or converts the transactional data for each old credit card number, starting with the first old credit card number, in a plurality of input vectors, with each input vector representing the start of a sequence of transactional data to be analyzed, the transactional data for one of the days, or a separation between sections of the transactional data such as a separation between each month of transactional data. The embedding of the transactional data into the input vectors may involve the application of an embedding algorithm, wherein the transactional data is input to the embedding algorithm and the input vectors are output by the embedding algorithm. Referring to FIG. 7, a plurality of input vectors are shown with each input vector represented by a vertically oriented rectangle labeled "VEC". The input vectors include a start input vector to indicate the start of a sequence, a plurality of day input vectors which include the transactional data for each day, wherein the day input vectors are grouped together to form a month's worth of input vectors, and a plurality of separator input vectors which indicate a separation between months.

Each input vector is formed by a plurality of embeddings that are added or concatenated together. A first embedding is a token embedding which includes a starter token ("[CLS]" in FIG. 7), a separator token ("[SEP]" in FIG. 7), and a day token ("T #" in FIG. 7, wherein # indicates the day of the month). The starter token includes information that indicates the start of a sequence. The separator tokens include information that indicates one month of transactional data has ended and another month of transactional data is about to begin. The day tokens include transactional data from each day. A second embedding is a segment embedding ("E" in FIG. 7) which indicates segments of the data, wherein each month might include one segment of data. Typically, the segment embeddings for each day of the month are the same, but are different from month to month. A third embedding is a positional embedding ("P #" in FIG. 7, wherein # indicates the day of the month). The positional embedding for each day of a given month includes sequential information to identify the day of the month for which the transactional data is being provided.

The processing element 16 inputs each input vector into a transformer encoder, as shown in FIG. 7. The transformer encoder may include a neural network architecture with a plurality of sequentially-positioned encoder cells such that an output of one encoder cell provides an input to the next encoder cell in the sequence. Each encoder cell may include, at least, a feed forward component and an attention component. The input vectors are input to the transformer encoder in order starting with the starter input vector followed by each of the month 1 input vectors in daily order followed by the first separator input vector and the month 2 input vectors and so forth. The transformer encoder processes the input vectors and outputs a plurality of output vectors in sequence with each output vector resulting from the processing of one of the input vectors.

A transformer encoder is typically paired with a transformer decoder. As shown in FIG. 8, the processing element 16 inputs the output vectors from the transformer encoder to the transformer decoder. The transformer decoder may include a neural network architecture with a plurality of sequentially-positioned decoder cells such that an output of one decoder cell provides an input to the next decoder cell in the sequence. Each decoder cell may include, at least, a feed forward component and multiple attention components. In various embodiments, each output vector from the transformer encoder may be received by each of the decoder cells. The transformer decoder processes the output vectors from the transformer encoder and outputs a plurality of tokens in vector format including a starter token ("[CLS]" in FIG. 8) followed by a sequence of transactional tokens ("T #", wherein # indicates a sequence number) that include predictive transactional information over time. For example, a first token, T1, includes a prediction of the transactional information, such as a payment amount, a merchant code, an industry, a geolocation, and the like, for a first time period, such as a day or a week, that occurs after the last time period for the vectors input into the transformer encoder. A second token, T2, may include the same or similar prediction of the transactional information for a second time period that occurs after the first time period. The subsequent tokens include the same or similar prediction of the transactional information for subsequent time periods. The transformer decoder may be selectively configured to output tokens for a chosen time period after the last time period for the vectors input into the transformer encoder. For example, the transformer decoder may be configured to output tokens for a selected number of months, such as 1, 2, or 3 months, after the last time period for the vectors input into the transformer encoder.

The output from the transformer decoder is the predicted transactional activity for the first old credit card number in the few months after the first old credit card number expired or the first old credit card was lost or stolen. Given the assumption that the account holder for the first old credit card and first old credit card number continued most of their spending habits from month to month between the first old credit card number and its corresponding new credit card number, then the predicted transactional activity for the first old credit card number should closely match the actual transactional activity of one of the new credit card numbers in the first cluster. Accordingly, the processing element 16 compares the predicted transactional activity of the first old credit card number during a first time period with the actual transactional activity during the first time period for each of the new credit card numbers of the first cluster. The processing element 16 may convert the tokens from the transformer decoder from vector format to regular data to perform the comparison. Or, the processing element 16 may convert the transactional data of each new credit card number into vector format before the comparison. The processing element 16 may apply one or more comparison techniques to compare the predicted transactional activity of the first old credit card number with the actual transactional activity for each of the new credit card numbers. Typically, the comparison involves comparing the predicted transactional activity of the first old credit card number with the actual transactional activity of one first cluster new credit card number at a time. Each comparison generates a difference value or error value which varies according to a likelihood that the new credit card number is a continuation match of the first old credit card number, wherein lower values are more likely to be matches. The new credit card number whose comparison with the first old credit card number generates the lowest difference or error value is likely the continuation match of the first old credit card number. Thus, the processing element 16 determines the new credit card number whose comparison with the old credit card number generates the lowest difference or error value to be the continuation match of the old credit card number.

The processing element 16 repeats the second matching process described above for each of the subsequent old credit card numbers and determines a new credit card number, from the associated cluster of new credit card numbers, that is likely to be a continuation match for the old credit card number.

FIGS. 9A and 9B depicts a listing of at least a portion of the steps of an exemplary computer-implemented method 100 for determining a new credit card number that is a continuation match with an old credit card number of a credit card that has changed numbers. The steps may be performed in the order shown in FIGS. 9A and 9B, or they may be performed in a different order. Furthermore, some steps may be performed concurrently as opposed to sequentially. In addition, some steps may be optional or may not be performed. The steps may be performed by the processing element 16 of the computing device 10 via hardware, software, firmware, or combinations thereof. Furthermore, the steps may be implemented as instructions, code, code segments, code statements, a program, an application, an app, a process, a service, a daemon, or the like, and may be stored on a computer-readable storage medium, such as the memory element 14.

Referring to step 101, transactional data for a plurality of credit card numbers for a plurality of credit card customers is received. The data may include a transaction timestamp (such as a date and time of day), a geolocation (such as an address) where the transaction occurred, an amount of money spent, or a value of the transaction, a name of the merchant billing the transaction, a merchant category code, a code as to whether the credit card was present or not for the transaction, an issuer of the credit card, a type or level of credit card (such as standard, travel miles, silver, gold, platinum, etc.), and so forth. The data includes transactions from credit cards that have different credit card numbers but are known to be connected to the same account and/or account owner (through automatic billing update (ABU) information) as well as credit cards with different credit card numbers for which it is not known whether any two credit cards are connected to the same account.

Referring to step 102, a plurality of "old" credit card numbers and a plurality of "new" credit card numbers are determined so that one new credit card number can be matched with each old credit card number. Old credit card numbers may be associated with a plurality of transactions that occurred before a given first date (wherein the first date may be different for each credit card number) where the transactions stopped after the first date because the credit card associated with the old credit card number was lost or stolen, expired, or upgraded. New credit card numbers may be associated with a plurality of transactions that occurred after a given second date (wherein the second date may be different for each credit card number), since it is likely the new credit card number issued around the time of the second date.

Referring to step 103, additional transactional data from earlier-received transactional data is derived from the received data. For example, the processing element 16 may derive an industry in which the transaction occurred from the name of the merchant and/or the merchant category code. The processing element 16 may derive a week number from the timestamp data representing a week of a month in which the transaction occurred. The week number may have a value from 1 to 5, wherein if the date of the transaction occurred on any of days 1-7, then the week number is 1; if the date of the transaction occurred on any of days 8-14, then the week number is 2; and so forth. The processing element 16 may assign a week number to each transaction based on the timestamp of when the transaction occurred. The processing element 16 may derive transaction counts as a total number of transactions that occurred for a given parameter, such as card number, industry, etc., for a given time period. The processing element 16 may derive merchant counts as a total number of merchants for a given industry, a given time period, or the like. The processing element 16 may derive a total amount of money billed to each industry.

Referring to step 104, a first group of old credit card numbers that have likely been upgraded and a second group of old credit card numbers that have likely not been upgraded is determined. Referring to FIG. 2, the processing element 16 applies a first filter based on a probability that an old credit card number has stopped transacting as a result of the credit card being upgraded to a card with enhanced benefits. Typically, credit card upgrade offers are made to customers based on their spending patterns or habits. Given the ABU information, the processing element 16 has a record of a plurality of old credit card numbers that are known to have changed to new credit card numbers as the result of a card upgrade. Therefore, the processing element 16 has a transaction history, and thus, spending patterns, of each of the old credit card numbers and can develop models that are indicative of credit card numbers that have stopped transacting because they have been upgraded, as opposed to other reasons for no longer transacting. The models may be based on spending patterns and other data. For each old credit card number, the processing element 16 computes a probability of whether the credit card associated with it has been upgraded. For each old credit card number with a probability greater than or equal to an upgrade threshold, the processing element 16 creates a first group of old credit card numbers and sorts that credit card number as high probability and applies subsequent filters to it. For each old credit card number with a probability less than the upgrade threshold, the processing element 16 creates a second group of old credit card numbers and sorts that credit card number as low probability and applies some of the same filters to it.

Referring to step 105, a plurality of clusters of new credit card numbers with one cluster of new credit card numbers associated with each old credit card number in the first group and one cluster of new credit card numbers associated with each old credit card number in the second group is determined. Following the high probability path shown in FIG. 2, the processing element 16 applies a second filter based on the issuer of the credit card. For each old credit card number, the processing element 16 eliminates all of the new credit card numbers that have a different issuer from the old credit card number.

The processing element 16 applies a third filter based on a geolocation of the transactions of the new credit card numbers compared with the old credit card numbers. For example, for each old credit card number, the processing element 16 compares the geolocations of a portion of the transactions with the geolocations of a portion of the transactions of each of the new credit card numbers. If the geolocations of the transactions for a new credit card number are greater than a distance threshold from the geolocations of the transactions of the old credit card number, then the processing element 16 eliminates the new credit card number as being a continuation for the old credit card number.

The processing element 16 applies a fourth filter based on a time period during which a first transaction of a new credit card number occurs. Typically, when a credit card changes from an old number to a new number, the new credit card number is used for a first time within a certain time period, or window, such as three months, after the old credit card number stops transacting. Thus, for each old credit card number, the processing element 16 compares a date of the first transaction of the new credit card numbers with a date of the last transaction of the old credit card number. The processing element 16 eliminates the new credit card number as being a continuation for the old credit card number if the date of the first transaction of the new credit card number occurs outside of a time period threshold (approximately three months) of the date of the last transaction of the old credit card number.

The processing element 16 applies a fifth filter based on a type or level of credit card. For example, for each old credit card number, the processing element 16 compares the type or level of the credit card, such as silver, gold, platinum, world, world elite, etc., with the type or level of the new credit card numbers. The processing element 16 eliminates the new credit card number as being an upgrade continuation match for the old credit card number if the type or level of the new credit card number is a downgrade, such as going from world elite to world, from the old credit card number.

As shown at the bottom of FIG. 2, after the filters have been applied to all of the old credit card numbers likely to have upgraded, a first group of old credit card numbers and a first group of new credit card numbers are created. For each old credit card number, "Old Card #" in FIG. 2 wherein the number # ranges from 1 to M, there is an associated cluster, "Cluster #" in FIG. 2 wherein the number # ranges from 1 to M, of new credit card numbers, "New Cards" in FIG. 2, which are potential links as the upgrade of the old credit card number. It is possible that each cluster of new credit card numbers has a plurality of credit card numbers that are the same as in one or more of the other clusters. The processing element 16 applies a first matching process, discussed below, that tries to match one new credit card number with each old credit card number as the upgrade of the old credit card number.

Following the low probability path shown in FIG. 2, the processing element 16 applies filters 2, 3, and 4 to the old credit card numbers that have likely not upgraded. The processing element 16 may not apply filter 5 because it is unlikely that the type or level of credit card would change if the old number expires or the credit card is lost or stolen. The processing element 16 may apply the filters to each group of credit card numbers (high upgrade probability and low upgrade probability) at roughly the same time or may apply the filters to one group before applying the filters to the other group. After the filters have been applied to all of the old credit card numbers likely to have not upgraded, a second group of old credit card numbers and a second group of new credit card numbers are created. For each old credit card number, "Old Card #" in FIG. 2 wherein the number # ranges from 1 to N, there is an associated cluster, "Cluster #" in FIG. 2 wherein the number # ranges from 1 to N, of new credit card numbers, "New Cards #" in FIG. 2, which are potential links or continuation matches of the old credit card number. It is possible that each cluster of new credit card numbers has a plurality of credit card numbers that are the same as in one or more of the other clusters. The processing element 16 applies a second matching process, discussed below, that tries to match one new credit card number with each old credit card number as the continuation match of the old credit card number.

Referring to step 106, the transactional data for each old credit card number in the first group and the cluster of new credit card numbers associated with each old credit card number in the first group is converted into snapshots with an image-like data format. Generally, an image is formed by a plurality of picture elements ("pixels") arranged in a two-dimensional grid. The data representing an image includes a color or intensity value for each pixel present in the image, wherein the image includes a first number of pixels in the X dimension (Px) and a second number of pixels in the Y dimension (Py) such that a total number of pixels (Pxy) is first number multiplied by second number (Px×Py). In other words, there may be Py rows of pixels and Px columns of pixels. In addition, each pixel includes a red subpixel, a green subpixel, and a blue subpixel (RGB), wherein each subpixel has a value as well. Thus, the image-like data format may include three values for each pixel in a first row of pixels, three values for each pixel in a second row of pixels, and so forth through the last row of pixels.

An exemplary generic image is shown in FIG. 3 and, in this example, includes 6 pixels by 8 pixels for a total of 48 pixels. FIG. 3 also includes an example of a generic image data format shown in a tabular format with numeric values for red subpixels, green subpixels, and blue subpixels, along with a plurality of labels and values for row numbers, column numbers, and pixel numbers. An image data file may actually only include the values for the subpixels in a sequential listing along with metadata about the file—although this file description typically only applies to uncompressed and/or unencoded image data file formats. Compressed and/or encoded image data files may have a different format.

To form one snapshot of transaction data in the image-like data format, the processing element 16 gathers all of the transaction data for one credit card number. An example of the transaction data for one credit card number in snapshot form is shown in FIG. 4, wherein the snapshot includes a plurality of pixels. The pixels have a naming format of "PW #,I #", wherein "P" refers to each pixel, "W #" refers to a week number, and "I #" refers to a number, or code, of an industry—all as described in more detail below.

Each row of pixels includes received and/or derived data regarding transactions that occurred within the same week, that is, transactions having the same week number, "W #" in FIG. 4. For example, the first row of pixels includes transactional data that has a week number equal to 1. The second row of pixels includes transactional data that has a week number equal to 2—and so forth through row number 5 with week number 5.

Each column of pixels includes received and/or derived data regarding transactions that occurred in a particular industry or has a particular merchant category code, "I #" in FIG. 4. For example, a first column of pixels may include transactional data that occurred in a medical industry, such as a doctor's office. A second column of pixels may include transactional data that occurred in the medical industry, such as a hospital. A third second column of pixels may include transactional data that occurred in the airline industry. A fourth second column of pixels may include transactional data that occurred in the hotel industry. There may be "X" (dozens or hundreds) columns of pixels, each relating to transactions occurring in a specific industry and/or merchant category code.

Also shown in FIG. 4 is a table illustrating the data format of a snapshot including a format for each subpixel of each pixel. Each individual pixel includes red, green, and blue subpixel values. The subpixel values may include received and/or derived data regarding various transactional metrics. For example, the red subpixel value may include a total amount of money spent for the particular week number (row number) and the particular industry (column number). The green subpixel value may include a transaction count or total number of transactions for the particular week number (row number) and the particular industry (column number). The blue subpixel value may include a merchant count or total number of merchants involved in transactions for the particular week number (row number) and the particular industry (column number). All of the subpixel values are related to the same credit card number for each snapshot of data. The subpixel values may include received and/or derived data regarding other transactional metrics and still be within the scope of the current invention.

Each snapshot includes a listing of numbers which are the values for each subpixel of each pixel for one card number for one month's worth of transactions. The numbers may be listed in the sequence shown in the table of FIG. 4 or in another sequence. The snapshot may also include metadata and/or separators between the numbers.

The processing element 16 forms the snapshots, each snapshot including the data as discussed above for one credit card number for one month. If the transactional data does not include data for some of the pixel categories, such as a particular industry for a particular week, the processing element 16 may fill those values with zeros.

Referring to step 107, a modified Siamese network is trained with a plurality of instances of a combination of an old credit card number of a third group of old credit card numbers, a new credit card number that is an upgrade continuation match of the old credit card number, and a new credit card number that is not an upgrade of the old credit card number. The Siamese network includes at least two neural networks of the same architecture, each neural network including the same weights. Each neural network may include one or more artificial neural networks that each have an input layer of neurons, a hidden layer of neurons, and an output layer of neurons. Each neuron may execute a mathematical function involving a weight (W) and an input (x), wherein the weight and the input may vary for each neuron and the mathematical function is often multiplication of the weight and the input. An exemplary neural network includes a convolutional neural network (CNN) coupled with a long short term memory (LSTM) network, wherein the output of one network provides the input to the other network. Generally, each neural network receives a first data set, such as a snapshot, as an input and outputs a second data set, typically smaller in size or number than the first data set, which includes only the fundamental features, or the essence, of the first data set.

The processing element 16 trains the modified Siamese network to be able to identify new credit card numbers that are continuations of old credit card numbers for which the credit card was upgraded. Referring to FIG. 5, the processing element 16 trains the modified Siamese network in part using the snapshot data from an old credit card number (A) which is known to have been upgraded (from the ABU information). The snapshot data includes a first month (m1) and a second month (m2), wherein the first month and the second month may be consecutive or there may be an interval between the first month and the second month. Thus, Am1 is a first snapshot from the first month and Am2 is a second snapshot from the second month. The modified Siamese network receives the snapshots Am1 and Am2 as inputs and outputs three components (a[1], a[2], a[3]) for each month, wherein one or more of the components may include delta information.

The processing element 16 also trains the modified Siamese network in part using the snapshot data from a new credit card number (P) known to be the upgrade continuation match of the old credit card number A from the ABU information. That is, the new credit card number P and the old credit card number A are known to be from the same credit card account. The snapshot data includes a third month (m3) and a fourth month (m4), wherein the third month and the fourth month may be consecutive or there may be an interval between the third month and the fourth month. Pm3 is a third snapshot from the third month and Pm4 is a fourth snapshot from the fourth month. In some embodiments, the interval between the first month and the second month is the same as the interval between the third month and fourth month. The modified Siamese network receives the snapshots Pm3 and Pm4 as inputs and outputs three components (p[1], p[2], p[3]) for each month.

The processing element 16 further trains the modified Siamese network in part using the snapshot data from a new credit card number (N) during the third month m3 and the fourth month m4, with Nm3 being a fifth snapshot and Nm4 being a sixth snapshot. The new credit card number N is known, perhaps through ABU information, to be unrelated to, and not associated with the same credit card account as, the old credit card number A. The modified Siamese network receives the snapshots Nm3 and Nm4 as inputs and outputs three components (n[1], n[2], n[3]) for each month.

The processing element 16 may input the snapshots Am1, Am2, Pm3, Pm4, Nm3, Nm4 into the modified Siamese network simultaneously utilizing multiple instances of the modified Siamese network or serially, in any order, utilizing a single instance of the modified Siamese network. In order to further train the modified Siamese network, the processing element 16 minimizes a modified loss function and back propagates updates to the weights of the neurons of the modified Siamese network. An exemplary modified loss function is shown below:

$$\max((a_{m1}[1]-p_{m3}[1])^2+(a_{m2}[1]-p_{m4}[1])^2+\{(a_{m2}[3]-a_{m1}[2])-(p_{m4}[3]-p_{m3}[2])\}^2-(a_{m1}[1]-n_{m3}[1])^2+(a_{m2}[1]-n_{m4}[1])^2+\{(a_{m2}[3]-a_{m1}[2])-(n_{m4}[3]-n_{m3}[2])\}^2+\text{Margin},0)$$

The processing element 16 may apply techniques such as gradient descent to back propagate updates to the weights. Furthermore, the processing element 16 may train the modified Siamese network with multiple combinations of an old credit card number, a known continuation new credit card number, and a known unrelated new credit card number. The training may continue until the changes to the weights are small.

Referring to step 108, the modified Siamese network is used to determine one new credit card number that is an upgrade continuation match of one old credit card number for each old credit card number in the first group. Referring to FIG. 6, the processing element 16 inputs a first snapshot from a first month (Am1) for an old credit card number and a second snapshot from a second month (Am2) for the old credit card number into the modified Siamese network. The processing element 16 starts with old credit card number 1, as shown in FIG. 4, in an attempt to match old credit card number 1 with one of the new credit card numbers from the first cluster of new credit card numbers. The modified Siamese network outputs three components (am1[1], am1[2], am1[3]) for the first snapshot and three components (am2[1], am2[2], am2[3]) for the second snapshot.

The processing element 16 inputs a third snapshot from a third month (Bm3) for a new credit card number and a fourth snapshot from a fourth month (Bm4) for the new credit card number into the modified Siamese network, wherein the new credit card number may be the first credit card number from the first cluster of new credit card numbers. The modified Siamese network outputs three components (bm3[1], bm3[2], bm3[3]) for the third snapshot and three components (bm4[1], bm4[2], bm4[3]) for the fourth snapshot. The processing element 16 calculates a cost function to determine the difference between the data for the old credit card number and the data for the new credit card number. An exemplary cost function is shown below:

$$(a_{m1}-[1]-b_{m3}[1])^2+(a_{m2}[1]-b_{m4}[1])^2+\{(a_{m2}[3]-a_{m1}[2])-(b_{m4}[3]-b_{m3}[2])\}^2$$

The processing element 16 inputs the appropriate snapshots and calculates the cost function for the old credit card number and each of the new credit card numbers from the first cluster of new credit card numbers in turn. The combination of the old credit card number and the new credit card number with the lowest value cost function indicates that the new credit card number is likely the upgrade continuation match of the old credit card number and the two numbers are associated with the same credit card account.

The processing element 16 repeats the above process of inputting two snapshots for one of the old credit card numbers and two snapshots for each of the new credit card numbers of subsequent clusters of credit card numbers into the modified Siamese network, calculating the cost function for each combination of old credit card number and new credit card number, and determining the combination with the lowest cost. The process repeats until an upgrade continuation match of one new credit card number has been determined for each of the old credit card numbers.

Referring to step 109, the transactional data for each old credit card number in the second group of old credit card numbers and each cluster of new credit card numbers that is associated with the old credit card numbers is serialized. The processing element 16 sorts and/or arranges the data associated with each transaction, such as time of day of transaction, transaction money amount, geolocation of the transaction, industry of transaction, merchant or merchant code involved, and the like, for each credit card number chronologically, or in the order in which they occurred. For example, the processing element 16 may generate the daily transaction information, i.e., all of the information associated with the transactions that occurred during one day, in sequential order for each month for a period of several months up to a year or more. One reason to sort the transaction data into the daily transactions that occur within a month is that often recurring, or periodic, payments occur once a month. For example, many services, such as phone service, cable TV, audio or video streaming services, and the like, bill their customers and automatically collect payment once a month. Furthermore, those types of payments are typically made on the same date each month. Thus, patterns based on the same payment being made on the same date each month may be recognized.

Referring to step 110, the serialized transactional data is embedded in a plurality of input vectors for each old credit card number. Starting with the first old credit card number, the serialized transactional data is embedded in input vectors, with each input vector representing the start of a sequence of transactional data to be analyzed, the transactional data for one of the days, or a separation between sections of the transactional data such as a separation between each month of transactional data. The embedding of the transactional data into the input vectors may involve the application of an embedding algorithm, wherein the transactional data is input to the embedding algorithm and the input vectors are output by the embedding algorithm. Referring to FIG. 7, a plurality of input vectors are shown with each input vector represented by a vertically oriented rectangle labeled "VEC". The input vectors include a start input vector to indicate the start of a sequence, a plurality of day input vectors which include the transactional data for each day, wherein the day input vectors are grouped together to form a month's worth of input vectors, and a plurality of separator input vectors which indicate a separation between months.

Each input vector is formed by a plurality of embeddings that are added or concatenated together. A first embedding is a token embedding which includes a starter token ("[CLS]" in FIG. 7), a separator token ("[SEP]" in FIG. 7), and a day token ("T #" in FIG. 7, wherein # indicates the day of the month). The starter token includes information that indicates the start of a sequence. The separator tokens include information that indicates one month of transactional data has ended and another month of transactional data is about to begin. The day tokens include transactional data from each day. A second embedding is a segment embedding ("E" in FIG. 7) which indicates segments of the data, wherein each month might include one segment of data. Typically, the segment embeddings for each day of the month are the same, but are different from month to month. A third embedding is a positional embedding ("P #" in FIG. 7, wherein # indicates the day of the month). The positional embedding for each day of a given month includes sequential information to identify the day of the month for which the transactional data is being provided.

Referring to step 111 and FIG. 7, the input vectors for each old credit card number are input into a transformer encoder to generate output vectors. The transformer encoder may include a neural network architecture with a plurality of sequentially-positioned encoder cells such that an output of one encoder cell provides an input to the next encoder cell in the sequence. Each encoder cell may include, at least, a feed forward component and an attention component. The input vectors are input to the transformer encoder in order starting with the starter input vector followed by each of the month 1 input vectors in daily order followed by the first separator input vector and the month 2 input vectors and so forth. The transformer encoder processes the input vectors and outputs a plurality of output vectors in sequence with each output vector resulting from the processing of one of the input vectors.

Referring to step 112, the output vectors are input into a transformer decoder to generate predicted transactional activity for each old credit card number, as shown in FIG. 8. The transformer decoder may include a neural network architecture with a plurality of sequentially-positioned decoder cells such that an output of one decoder cell provides an input to the next decoder cell in the sequence. Each decoder cell may include, at least, a feed forward component and multiple attention components. In various embodiments, each output vector from the transformer encoder may be received by each of the decoder cells. The transformer decoder processes the output vectors from the transformer encoder and outputs a plurality of tokens in vector format including a starter token ("[CLS]" in FIG. 8) followed by a sequence of transactional tokens ("T #", wherein # indicates a sequence number) that include predictive transactional information over time. For example, a first token, T1, includes a prediction of the transactional information, such as a payment amount, a merchant code, an industry, a geolocation, and the like, for a first time period, such as a day or a week, that occurs after the last time period for the vectors input into the transformer encoder. A second token, T2, may include the same or similar prediction of the transactional information for a second time period that occurs after the first time period. The subsequent tokens include the same or similar prediction of the transactional information for subsequent time periods. The transformer decoder may be selectively configured to output tokens for a chosen time period after the last time period for the vectors input into the transformer encoder. For example, the transformer decoder may be configured to output tokens for a selected number of months, such as 1, 2, or 3 months, after the last time period for the vectors input into the transformer encoder.

Referring to step 113, the predicted transactional activity for one old credit card number is compared with actual transactional activity for each new credit card number in the cluster associated with the old credit card number. The output from the transformer decoder is the predicted transactional activity for the first old credit card number in the few months after the first old credit card number expired or the first old credit card was lost or stolen. Given the assumption that the account holder for the first old credit card and first old credit card number continued most of their spending habits from month to month between the first old credit card number and its corresponding new credit card number, then the predicted transactional activity for the first old credit card number should closely match the actual transactional activity of one of the new credit card numbers in the first cluster. Accordingly, the processing element 16 compares the predicted transactional activity of the first old credit card number during a first time period with the actual transactional activity during the first time period for each of the new credit card numbers of the first cluster. The processing element 16 may convert the tokens from the transformer decoder from vector format to regular data to perform the comparison. Or, the processing element 16 may convert the transactional data of each new credit card number into vector format before the comparison. The processing element 16 may apply one or more comparison techniques to compare the predicted transactional activity of the first old credit card number with the actual transactional activity for each of the new credit card numbers. Typically, the comparison involves comparing the predicted transactional activity of the first old credit card number with the actual transactional activity of one first cluster new credit card number at a time.

Referring to step 114, a new credit card number that is the continuation of the old credit card number is determined according to a difference between the predicted transactional activity and the actual transactional activity for each old credit card number of the second group. From step 113, each comparison generates a difference value or error value which varies according to a likelihood that the new credit card number is a continuation match of the first old credit card number, wherein lower values are more likely to be matches. The new credit card number whose comparison with the first old credit card number generates the lowest difference or error value is likely the continuation match of the first old credit card number. Thus, the processing element 16 determines the new credit card number whose comparison with the old credit card number generates the lowest difference or error value to be the continuation match of the old credit card number.

The processing element 16 repeats the second matching process described above in steps 109-114 for each of the subsequent old credit card numbers and determines a new credit card number, from the associated cluster of new credit card numbers, that is likely to be a continuation match for the old credit card number.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A computing device for determining a new credit card number that is a continuation match with an old credit card number of a credit card account that has changed numbers, the computing device comprising:
 a processing element in electronic communication with a memory element, the processing element programmed or configured to:
 receive transactional data for a plurality of credit card numbers for a plurality of credit card customers,
 determine a plurality of old credit card numbers and a plurality of new credit card numbers from among the plurality of credit card numbers, so that one of the new credit card numbers can be matched with a corresponding one of the old credit card numbers,
 determine a first plurality of clusters of the new credit card numbers including a successive cluster of the new credit card numbers associated with each of the old credit card numbers,
 convert the transactional data for each of the old credit card numbers and each new credit card number in the cluster of the new credit card numbers associated with each of the old credit card numbers into a successive one of a plurality of snapshots with an image-like data format, the plurality of snapshots including first through tenth snapshots,
 train a modified siamese network of a machine learning model to perform mathematical operations involving a plurality of weights, wherein the training comprises
 inputting first data into the modified siamese network, the first data including the first snapshot related to a first time period and the second snapshot related to a second time period, each of the first and second snapshots being associated with a first credit card number of the plurality of credit card numbers known to have been upgraded,
 receiving first output data from the modified siamese network as a result of inputting the first data into the modified siamese network,
 inputting second data into the modified siamese network, the second data including the third snapshot related to a third time period and the fourth snapshot related to a fourth time period, each of the third and fourth snapshots being associated with a second credit card number of the plurality of credit card numbers known to be an upgrade of the first credit card number,
 receiving second output data from the modified siamese network as a result of inputting the second data into the modified siamese network,
 inputting third data into the modified siamese network, the third data including the fifth snapshot related to a fifth time period and the sixth snapshot related to a sixth time period, each of the fifth and sixth snapshots being associated with a third credit card number of the plurality of credit card numbers that is not an upgrade of the first credit card number,
receiving third output data from the modified siamese network as a result of inputting the third data into the modified siamese network,
minimizing a modified loss function that includes the first output data, the second output data, and the third output data,
updating the plurality of weights of the modified siamese network with the minimized modified loss function,
repeating the training steps until the weights are updated with values less than a threshold, and
use the trained modified siamese network to determine one of the new credit card numbers that is an upgrade continuation match of one of the old credit card numbers for each of the old credit card numbers, wherein the usage for each one of the old credit card numbers comprises
inputting fourth data into the trained modified siamese network, the fourth data including a seventh snapshot related to a seventh time period and an eighth snapshot related to an eighth time period, each of the seventh and eighth snapshots being associated with the old credit card number,
receiving fourth output data from the trained modified siamese network as a result of inputting the fourth data into the trained modified siamese network,
inputting a plurality of fifth data into the trained modified siamese network, each fifth data including a ninth snapshot related to a ninth time period and a tenth snapshot related to a tenth time period, each pair of the ninth and tenth snapshots of the plurality of ninth and the plurality of tenth snapshots corresponding to one of the plurality of fifth data and being associated with a successive one of the new credit card numbers,
receiving a plurality of fifth output data from the trained modified siamese network, each fifth output data being a result of inputting a successive one of the fifth data into the trained modified siamese network,
calculate a plurality of cost functions, each cost function to determine a difference between the fourth output data and a successive one of the fifth output data for each combination of the old credit card number and a successive one of the new credit card numbers in the cluster of new credit card numbers associated with the old credit card number,
determine the new credit card number that is the upgrade continuation match of the old credit card number as the new credit card number which is associated with a lowest cost function, and
retrain the trained modified siamese network to back propagate updated values to the weights until the updated values are less than a threshold.

2. The computing device of claim 1, wherein determining the clusters of new credit card numbers includes applying a plurality of filters to the transactional data to reduce an amount of the new credit card numbers that are associated with each of the old credit card numbers.

3. The computing device of claim 2, wherein applying the filters includes, for each of the old credit card numbers, eliminating all of the new credit card numbers that have a different issuer from the old credit card number.

4. The computing device of claim 2, wherein applying the filters includes, for each of the old credit card numbers, eliminating all of the new credit card numbers that have transactions occurring in geolocations that are greater than a threshold distance from the geolocations of the transactions of the old credit card number.

5. The computing device of claim 2, wherein applying the filters includes, for each of the old credit card numbers, eliminating all of the new credit card numbers that have a date of a first transaction that is greater than a threshold time period after a date of a last transaction of the old credit card number.

6. The computing device of claim 2, wherein applying the filters includes, for each of the old credit card numbers, eliminating all of the new credit card numbers that have a level which is considered to be a downgrade from a level of the old credit card number.

7. The computing device of claim 1, wherein each of the snapshots includes transactional data for one of the plurality of credit card numbers that occurred during one month.

8. The computing device of claim 7, wherein converting the transactional data into the snapshots includes sorting the transactional data into rows and columns format wherein each row includes transactional data that occurred during one week of the month and each column includes transactional data from one of a plurality of industries.

9. The computing device of claim 1, wherein the processing element is further programmed or configured to:
determine, before the step of determining the first plurality of clusters of the new credit card numbers, a first group of the old credit card numbers that have likely been upgraded and a second group of the old credit card numbers that have likely not been upgraded,
determine a second plurality of clusters of the new credit card numbers including a successive cluster of the new credit card numbers associated with each one of the old credit card numbers in the second group,
serialize the transactional data for each of the old credit card numbers in the second group of the old credit card numbers and each cluster of the new credit card numbers that is associated with the old credit card numbers,
embed the serialized transactional data in a plurality of input vectors for each of the old credit card numbers in the second group,
input the input vectors for each of the old credit card numbers in the second group into a transformer encoder to generate a plurality of output vectors,
input the output vectors into a transformer decoder to generate predicted transactional activity for each of the old credit card numbers in the second group,
compare the predicted transactional activity for each one of the old credit card numbers with actual transactional activity for each of the new credit card numbers in the cluster associated with the old credit card number in the second group, and
determine one of the new credit card numbers that is the continuation of the old credit card number according to a difference between the predicted transactional activity of the old credit card number and the actual transactional activity of the new credit card numbers in the associated cluster for each of the old credit card numbers in the second group.

10. A computing device for determining a new credit card number that is a continuation match with an old credit card number of a credit card account that has changed numbers, the computing device comprising:
  a processing element in electronic communication with a memory element, the processing element programmed or configured to:
    receive transactional data for a plurality of credit card numbers for a plurality of credit card customers,
    determine a plurality of old credit card numbers and a plurality of new credit card numbers from among the plurality of credit card numbers, so that one of the new credit card numbers can be matched with a corresponding one of the old credit card number,
    determine a first group of old credit card numbers that have likely been upgraded and a second group of old credit card numbers that have likely not been upgraded,
    determine a plurality of first clusters of new credit card numbers with a successive first cluster of the new credit card numbers associated with each of the old credit card numbers in the first group and a plurality of second clusters with a successive second cluster of the new credit card numbers associated with each of the old credit card numbers in the second group,
    convert the transactional data for each of the old credit card numbers in the first group and the first cluster of the new credit card numbers associated with each of the old credit card numbers in the first group into a plurality of snapshots with an image-like data format, the plurality of snapshots including first through tenth snapshots,
    train a modified siamese network of a machine learning model to perform mathematical operations involving a plurality of weights, wherein the training comprises
      inputting first data into the modified siamese network, the first data including the first snapshot related to a first time period and the second snapshot related to a second time period, each of the first and second snapshots being associated with a first credit card number of the plurality of credit card numbers known to have been upgraded,
      receiving first output data from the modified siamese network as a result of inputting the first data into the modified siamese network,
      inputting second data into the modified siamese network, the second data including the third snapshot related to a third time period and the fourth snapshot related to a fourth time period, each of the third and fourth snapshots being associated with a second credit card number of the plurality of credit card numbers known to be an upgrade of the first credit card number,
      receiving second output data from the modified siamese network as a result of inputting the second data into the modified siamese network,
      inputting third data into the modified siamese network, the third data including the fifth snapshot related to a fifth time period and the sixth snapshot related to a sixth time period, each of the fifth and sixth snapshots being associated with a third credit card number of the plurality of credit card numbers that is not an upgrade of the first credit card number,
      receiving third output data from the modified siamese network as a result of inputting the third data into the modified siamese network,
      minimizing a modified loss function that includes the first output data, the second output data, and the third output data,
      updating the plurality of weights of the modified siamese network with the minimized modified loss function,
      repeating the training steps until the weights are updated with values less than a threshold, and
    use the trained modified siamese network to determine one of the new credit card numbers that is an upgrade continuation match of one of the old credit card numbers for each of the old credit card numbers in the first group, wherein the usage for each one of the old credit card numbers comprises
      inputting fourth data into the trained modified siamese network, the fourth data including a seventh snapshot related to a seventh time period and an eighth snapshot related to an eighth time period, each of the seventh and eighth snapshots being associated with the old credit card number,
      receiving fourth output data from the trained modified siamese network as a result of inputting the fourth data into the trained modified siamese network,
      inputting a plurality of fifth data into the trained modified siamese network, each fifth data including a ninth snapshot related to a ninth time period and a tenth snapshot related to a tenth time period, each pair of the ninth and tenth snapshots of the plurality of ninth and the plurality of tenth snapshots corresponding to one of the plurality of fifth data and being associated with a successive one of the new credit card numbers,
      receiving a plurality of fifth output data from the trained modified siamese network, each fifth output data being a result of inputting a successive one of the fifth data into the trained modified siamese network,
      calculate a plurality of cost functions, each cost function to determine a difference between the fourth output data and a successive one of the fifth output data for each combination of the old credit card number and a successive one of the new credit card numbers in the cluster of new credit card numbers associated with the old credit card number,
      determine the new credit card number that is the upgrade continuation match of the old credit card number as the new credit card number which is associated with a lowest cost function, and
    retrain the trained modified siamese network to back propagate updated values to the weights until the updated values are less than a threshold,
    serialize the transactional data for each old credit card number in the second group of old credit card numbers and each cluster of new credit card numbers that is associated with the old credit card numbers in the second group,
    embed the serialized transactional data in a plurality of input vectors for each of the old credit card numbers in the second group,
    input the input vectors for each of the old credit card numbers in the second group into a transformer encoder to generate a plurality of output vectors,
    input the output vectors into a transformer decoder to generate predicted transactional activity for each of the old credit card numbers in the second group, compare the predicted transactional activity for each one of the old credit card numbers with actual transactional activity for each of the new credit card numbers in the cluster associated with the old credit card number in the second group, and determine one of the new credit card numbers that is the continuation of the old credit card number according to a difference between the predicted transactional activity of the old credit card number and the actual transactional activity of the new credit card numbers in the associated cluster for each of the old credit card numbers in the second group.

\* \* \* \* \*